United States Patent [19]

Meltsch et al.

[11] Patent Number: 5,313,018
[45] Date of Patent: May 17, 1994

[54] CABLE SLEEVE COMPOSED OF A LONGITUDINALLY-DIVIDED HOUSING

[75] Inventors: Hans-Juergen Meltsch, Schwerte; Hermann Klostermeyer; Detlef Graefe, both of Hagen, all of Fed. Rep. of Germany

[73] Assignee: RXS Schrumpftechnik-Garnituren GmbH, Fed. Rep. of Germany

[21] Appl. No.: 950,657

[22] Filed: Sep. 23, 1992

[30] Foreign Application Priority Data

Nov. 22, 1991 [DE] Fed. Rep. of Germany ....... 4138462

[51] Int. Cl.⁵ ............................................. H02G 15/113
[52] U.S. Cl. .................................... 174/92; 174/77 R; 174/93; 174/155
[58] Field of Search .................... 174/88 R, 92, 93, 91, 174/77 R, 155, 156

[56] References Cited

U.S. PATENT DOCUMENTS

| 3,935,373 | 1/1976 | Smith et al. | 174/77 R |
| 3,946,144 | 3/1976 | Quante | 174/92 |
| 4,117,259 | 9/1978 | Giebel et al. | 174/92 |
| 4,743,209 | 5/1988 | Gittle | 174/92 X |
| 4,875,952 | 10/1989 | Mullin et al. | 174/92 X |
| 4,914,261 | 4/1990 | Tokumaru et al. | 174/92 |
| 5,006,669 | 4/1991 | Bachel et al. | 174/93 |

FOREIGN PATENT DOCUMENTS

| 0248181 | 12/1987 | European Pat. Off. |
| 941734 | 4/1956 | Fed. Rep. of Germany. |
| 2515939 | 8/1978 | Fed. Rep. of Germany. |
| 2648630 | 12/1990 | France. |
| 1060255 | 3/1967 | United Kingdom. |

Primary Examiner—Morris H. Nimmo
Attorney, Agent, or Firm—Hill, Steadman & Simpson

[57] ABSTRACT

A cable sleeve is composed of longitudinally-divided cable sleeve shells that have a housing parting plane. The cable introduction areas are disposed spaced from this parting plane and, preferably, in a separate introduction parting plane so that when the cable sleeve shells are opened up to gain access to the interior, the seals on the cable introduction openings are not destroyed and remain unaffected.

20 Claims, 3 Drawing Sheets

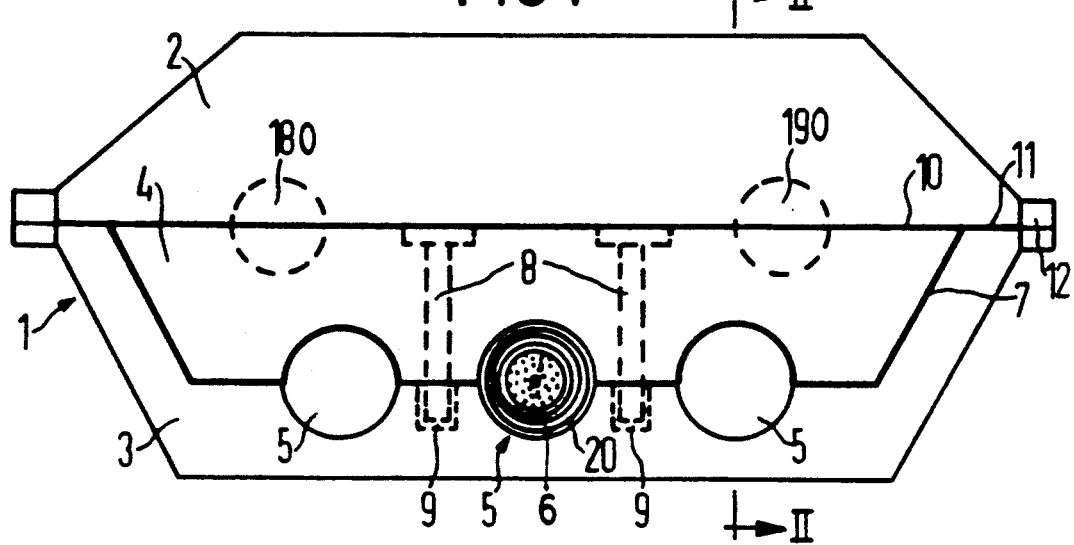
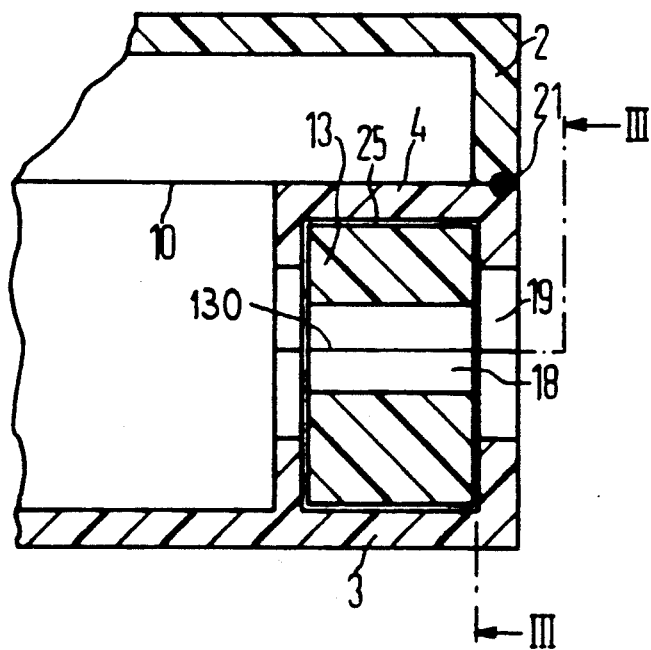

CABLE SLEEVE COMPOSED OF A LONGITUDINALLY-DIVIDED HOUSING

BACKGROUND OF THE INVENTION

The present invention is directed to a cable sleeve composed of a longitudinally-divided cable housing having a sealing system in the parting plane of the housing and having cable introduction areas in the end faces of the housing.

U.S. Pat. No. 4,117,259, whose disclosure is incorporated herein by reference thereto and which claims priority from German Application 25 15 939, discloses a cable sleeve that is composed of two half-shells, wherein the cable introduction openings lie in a parting plane of the sleeve housing. Given such a sleeve form, the cable introduction openings must be completely renewed after the sleeve has been opened.

SUMMARY OF THE INVENTION

The object of the present invention is to create a cable sleeve having a longitudinal division, wherein the cable introduction areas remain unaffected given subsequent opening of the cable sleeve. The stated object is inventively achieved with a cable sleeve of the above known type, wherein the parting plane for the two shells is free of cable introduction openings, and these introduction openings are provided in an additional parting plane which is independent of the parting plane of the housing.

In half-sleeves that have been standard up to now, the parting plane of the half-shell simultaneously lies in the parting plane of the cable introduction openings so that the seals in the cable introduction areas are also affected when the cable sleeve is opened. When opening the cable sleeve for the purposes of changing the wiring, for seeking errors or for repairing spliced connections, the introduction areas of the cables are thereby also opened. This quite frequently leads to an irreversible damage to the cable sleeve so that the cable sleeve is no longer tight in these regions after being reclosed. The seal must, thus, be completely renewed, which increases the cost.

The invention, however, is a matter of a cable sleeve having a separate sealing region for each of the cable introduction openings, whereby the employment of an uncut cable is possible, even without the employment of shrink technology. This solution provides a second parting plane in which the cables to be introduced are arranged. This second parting plane is covered by one of the long surfaces of an adapted sealing member, whereby the height of the sealing member is dimensioned so that the long surface lying opposite the first surface forms a first parting plane together with the limiting surface of one of the half-shells. This parting plane is separated from the cable introduction plane in this way and the cable introduction plane can remain unaffected when the cable sleeve is opened.

The cables to be introduced are wound with plastic or elastic sealant and are placed into the provided depressions or, respectively, introduction openings of the second parting plane in the cable sleeve. The cable introduction openings can be pre-formed at the factory or can be produced at the assembly site by, for example, drilling or breaking away a portion of the cable sleeve. Snap-in or, respectively, snap-out seal inserts can also be provided in the introduction openings, and these seal inserts are, for example, potentially composed of rubber or some other elastic material. The seal inserts can also be introduced with glue or with a sealing paste, wherein the latter has corresponding introduction diameters.

A sealing band is placed between the shell of the cable sleeve and the seal member; however, a seal system having a channel-shaped fashion and corresponding seal inserts can also be utilized. The seal member is advantageously firmly attached onto the lower shell of the cable sleeve or is clamped by latching, potentially given the assistance of appropriate tools, so that the cables are sealed in this manner. As a result thereof, the cable introduction area is separate from the parting plane between the shells of the cable sleeve. The edge of the lower shell of the cable sleeve and the upper surface of the seal member then, for example, form a plane as sealing surfaces for the cover of the cable sleeve or, respectively, the half-shell belonging thereto. The seal for this is preferably elastic and can be located either in the upper shell of the cable sleeve or cover or on a lower cable sleeve unit.

When the cable sleeve is reopened at a later time, the cable introduction areas can remain unaffected and the closing measures to be undertaken after the switching work has been completed are, thus, limited to simple seals between the shells of the cable sleeve. The elastic seals guarantee an easy opening and closing of the cable sleeve and are reusable. The seal member has to be removed only when a change in the cable occupation occurs. The cable sleeve is suitable for use for uncut cables, since the introduction area is fully accessible by removing the seal member. However, it is also possible to mount tubes, for example closed at one end as well, into the introduction openings not being occupied by cables so that the cables can be introduced at a later date. It is thereby not necessary to open the cable introduction area. The sealing occurs with a shrink hose, a plug bushing or a clamped half-shell. The seal member can be fashioned so that a plurality of parting planes also occurs. As a result thereof, a plurality of cables can be brought in or, respectively, out of the cable sleeve.

The upper shell of the cable sleeve or, respectively, the cover of the cable sleeve can also be provided as a structure that is flat or that is slightly arced in the region of the splicing space. It may be a mirror-symmetrical vis-a-vis the lower shell, but otherwise identical. It is, thus, also possible to provide the cover or, respectively, the upper half-shell with or without cable outlets.

The mutual closure of the shells of the cable sleeve preferably occurs with screws or with conical clamp rails, which are pushed onto either the conical or tapering fashioned flange necks of the shells. Snap-on clips or individual snap-on catch screws are also conceivable, as in the one-sided overlap in the longitudinal seal, whereby closure elements are then only required at the opposite sides. It is also conceivable that the two half-shells are interconnected along one edge by a film hinge.

The areas of employment for such cable sleeves are many and also extend, for example, to employment in underground cables, manhole cables and overhead cables.

The seals in the annular gaps around the cables can be undertaken by wrapping with appropriate plastic or elastic sealant that is known per se, wherein problems can occur with small cables. Combination seal systems, for example of plastic and elastic sealant, can also be utilized, and these supplement one another in the seal space so that greater differences in the diameter can also be bridged. For this purpose, the cable introduction area should be shaped so that an elastic block having an introduction diameter that is smaller in comparison to the hard wall of the half-shell is introduced into the seal area of the cable introduction so that the sealing occurs by compressing seal material. Multiple occupations in a cable introduction opening can be obtained with the assistance of a filler element having a plurality of radially outwardly opening recesses. Another possibility of sealing in the cable introduction area occurs given a plug bushing that likewise lies in the parting plane so that use given cut cables can occur. Bushings having a broad range of employment with respect to the cable diameters should then be mainly employed.

Other advantages and features of the invention will be readily apparent from the following description of the preferred embodiments, the drawings and claims.

BRIEF DESCRIPTION OF THE DRAWINGS

FIG. 1 is an end view of a cable sleeve in accordance with the present invention;

FIG. 2 is a partial cross sectional view through a portion of the cable sleeve at a cable introduction opening taken along the line II—II of FIG. 1;

DESCRIPTION OF THE PREFERRED EMBODIMENTS

Figure 3:
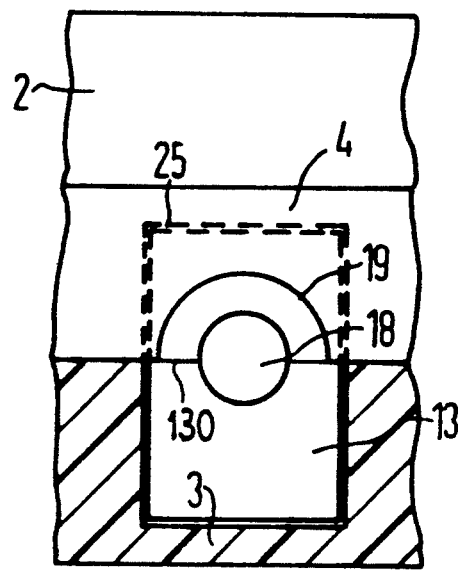
FIG. 3 is a cross sectional view taken along the lines III—III of FIG. 2.

The principles of the present invention are particularly useful when incorporated in a cable sleeve, generally indicated at 1 in FIG. 1. The cable sleeve 1 can have an external shaping with respect to the contours, which can be arbitrarily modified. The cable sleeve 1, however, is essentially composed of a lower cable sleeve shell 3 and of an upper cable sleeve shell 2, which may be, respectively, a cover. The lower cable sleeve shell 3 can be separated from the upper cable sleeve shell 2 in the housing parting plane 10 via a seal system in an known way, wherein closure elements having, for example, the form of flanges 12 are arranged along the edges, and these are held together in a sealing fashion with either screws or clamps. To this extent, the embodiment, thus, essentially corresponds to the previously-known embodiments and has a longitudinally-divided cable sleeve form composed of two cable sleeve shells, wherein, however, the cable introductions were arranged in the parting plane. This, however, has the disadvantage that when the cable sleeve 1 is reopened at a later time, seals in the cable introduction areas must also be renewed.

In the embodiment of the invention, however, an improved method is now pursued, so that the cable introduction seals can remain unaffected when the cable sleeve 1 is reopened. To this end, the cable introductions having the corresponding cable introduction openings 5 are displaced into a separate parting plane 7 that is independent of the housing parting plane 10. This is achieved in that the front side of one of the cable sleeve shells, such as 3, is longitudinally divided a second time so that a sealing member 4 is inserted, as shown in FIG. 1. The required cable introduction openings 5 are then introduced into this new parting plane 7. The sealing between the seal member 4 and the adapted remanent of the front side of the cable sleeve shell 3 occurs by insertion of a suitable sealing compound and the mutual clamping of the member 4 to the shell 3 is produced with the assistance of clamps or screws 8, which are received in bores 9 provided in the shell 3. An upper edge 11 of the cable sleeve shell 3 and the upper side of the sealing member 4 are mated to one another so that a through parting plane 10 occurs, wherein a sealing system vis-a-vis the upper cable sleeve shell 2 is situated. In addition, the cable introduction openings can, likewise, be introduced into the housing parting plane 10 as well as needed, however, these cable introduction openings, such as 180 and 190, are then destroyed as usual when the cable sleeve is opened. It is shown in the middle cable introduction opening 5 that the seal in the annular gap between the cable having a smaller diameter than the larger cable introduction opening 5 can be pressed in with a plurality of layers of seal tape 20 on the cable 6.

Finally, it is also possible that the front side of the upper cable sleeve shell 2 can also be longitudinally divided when there is a greater need for cable introduction openings. The same measures can then be undertaken here, as in the case with the lower cable sleeve half-shell 3.

The face-end walls of the cable sleeve shells 2 and 3, for example, can also comprise a lamella structure in the longitudinal direction. For, example, a plurality of lamella-like, thin walls are arranged lying behind one another. The sealing effect can, thereby, be improved.

A cross sectional view of the cable introduction area in accordance with the present invention is shown in FIG. 2. An elastic or plastic seal block 13 is employed here as a seal. This block is provided with a cable introduction opening 18, whose diameter is smaller than the cut-out cable introduction opening 19 in the front wall of the lower cable sleeve shell 3 and member 4. When the seal member 4 is secured on the shell 3, the seal block 13 is then pressed in a sealing fashion into the provided sealing chamber 25 against the walls and against the introduced cable. A seal system having a packing cord 21 is arranged in the housing parting plane 10 and seals vis-a-vis the upper cable sleeve shell 2 to the sleeve shell 3 or to an appropriate portion of the seal member 4.

As best shown in FIG. 3, the block 13, which can be divided along a line 130, as illustrated, fills out the sealing chamber 25. The diameter of the cable introduction opening 19 in the outside wall of the cable sleeve shell 4 is larger than the diameter of the cable introduction opening 18 in the seal block 13 in order to be able to guarantee the compression of the seal block 13.

Figure 4:
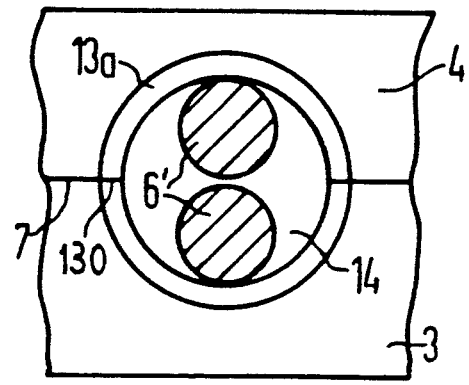
FIG. 4 is a partial end view of a cable introduction opening in accordance with the present invention having multiple cable insertions.

If multiple occupation in a cable introduction opening with cables 6' is also desired, it is possible when appropriate sealant is provided, as illustrated in FIG. 4. This, for example, can occur with a plastic material that may be appropriately pre-formed; however, a filler element 14 that is already pre-formed and having appropriate recesses for the cables 6' can be utilized. The seal block 13a can also be seen here in the cable introduction opening of the cable sleeve shells 3 and 4.

Figure 5:
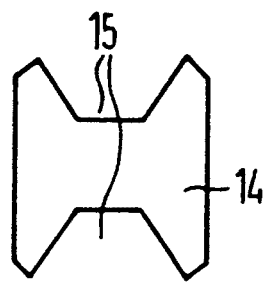
FIG. 5 is an end view of a filler element for insertion into a cable introduction opening having multiple cable insertions.

The filler element 14 of deformable material is shown in FIG. 5 and can be compressed with intimate conformity inside the cable introduction opening. The filling element 14 comprises laterally-opening recesses 15 into which the cables, such as 6' of FIG. 4, are introduced. The illustrated form of the filling element 14 only shows the basic design. Of course, correspondingly rounded-off contours already matched to the diameter are also possible.

Figure 6:
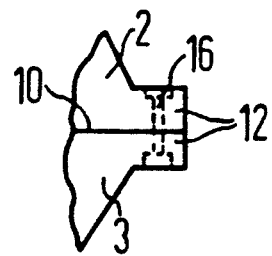
FIG. 6 is a partial end view showing one embodiment for connecting the shells with locking screws.

As mentioned above, the cable shells 2 and 3 can be connected together on their projecting flanges 12. For example, as illustrated in FIG. 6, the flanges are pressed together by screws 16 and produce the required seal via the seal system, which is not shown, that is introduced into the housing parting plane 10.

Figure 7:
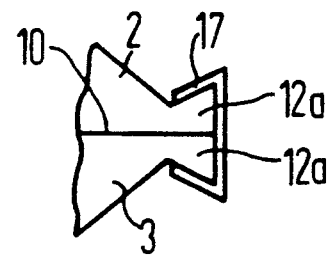
FIG. 7 is a partial end view showing a modification for connecting the shells with the assistance of a rail clamp.

Another possibility or modification for the mutual connection of the cable sleeve shells 2 and 3 is illustrated in FIG. 7. In this embodiment, the two applied flanges 12a have an undercut wedge shape, so that a clamp 17 in the form of, for example, a longitudinal rail can be drawn onto and protected against slippage as a mutual connection.

Figure 8:
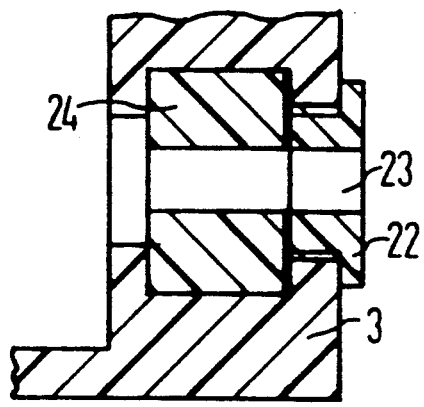
FIG. 8 is a partial cross sectional view similar to FIG. 2 showing a plug bushing introduction and seal element.

A cable introduction opening with a known plug-type bushing can also be provided, as illustrated in FIG. 8. In this embodiment, the compression of the sealant material 24 introduced in the sealed chamber of the cable sleeve shell 3 occurs here with the assistance of a pressure created by a threaded member 22 that has a cable introduction opening 23. For the test, the conditions are similar to those of the previous examples, particularly the fashioning of a second parting plane for the cable introduction openings that are independent of the housing parting plane.

Although various minor modifications may be suggested by those versed in the art, it should be understood that we wish to embody within the scope of the patent granted hereon all such modifications as reasonably and properly come within the scope of our contribution to the art.

We claim:

1. In a cable sleeve composed of a longitudinally-divided housing having a sealing system and a housing parting plane between a pair of cable sleeve shells, each of said shells having end walls with cable introduction openings being disposed in at least one of said end walls of one of the shells, the improvements comprising said one end wall having a matched seal member with a trapezoidal shape, said seal member having one edge forming a portion of the housing parting plane and a second edge forming a second parting plane being independent of the housing parting plane, said cable introduction openings being introduced in said second parting plane.

2. In a cable sleeve according to claim 1, wherein said at least one end wall is in a lower cable sleeve shell.

3. In a cable sleeve according to claim 1, wherein the cable introduction openings are recesses formed during the manufacturing process of the cable sleeve shell.

4. In a cable sleeve according to claim 1, wherein the cable introduction openings are cut into the end walls of the cable sleeve as needed.

5. In a cable sleeve according to claim 1, wherein the end walls of the cable sleeve shells are provided with break-away portions, said break-away portions being removed to form the cable introduction openings.

6. In a cable sleeve according to claim 1, further comprising introducing seal inserts in each of the cable introduction openings.

7. In a cable sleeve according to claim 1, wherein the housing parting plane and the second parting plane are provided with plastic sealant.

8. In a cable sleeve according to claim 1, wherein the housing parting plane and the second parting plane are provided with elastic sealant material.

9. In a cable sleeve according to claim 1, wherein sealing rings arranged on each of the introduction cables are provided for each of the cable openings.

10. In a cable sleeve according to claim 1, wherein said matched seal member and the one end wall are composed of lamellae lying one behind the other.

11. In a cable sleeve according to claim 1, further comprising a sealing chamber for the acceptance of a seal block of elastic sealant material being arranged in each cable introduction opening area, said seal block, respectively, having a cable introduction opening.

12. In a cable sleeve according to claim 11, wherein the diameter of the cable introduction opening in each end wall of the cable sleeve shells is larger than the diameter of the opening in the cable introduction opening of the seal block.

13. In a cable sleeve according to claim 1, wherein a filling element can be introduced into a cable introduction opening, said filling element having recesses accessibly proceeding from the outer circumference to enable introduction of two cables through said cable introduction opening.

14. In a cable sleeve according to claim 1, wherein each of the cable sleeve shells comprises laterally-projecting flanges proceeding in the longitudinal direction, said flanges receiving clamped elements for securing the cable sleeves together.

15. In a cable sleeve according to claim 14, wherein the clamped elements are threaded fasteners.

16. In a cable sleeve according to claim 14, wherein each of the lateral flanges has an undercut wedge-shaped cross section and said clamping elements are clamp rails which are received on said wedge-shaped flanges.

17. In a cable sleeve according to claim 1, wherein one of the cable introduction openings includes a threaded opening receiving a threaded bushing having a cable introduction opening.

18. In a cable sleeve according to claim 17, wherein the sleeve shell receives a sealing block and said threaded plug bushing engages said sealing block to form a seal with an introduced cable.

19. In a cable sleeve composed of a longitudinally-divided housing having a sealing system and a housing parting plane between a pair of cable sleeve shells, each of said shells having end walls with cable introduction openings being disposed in at least one of said end walls of one of the shells, the improvements comprising said one end wall having a seal member with an edge forming a portion of the housing parting plane and a second edge forming a second parting surface, said cable introduction opening being arranged only in the second parting surface so that opening of the sleeve shells will not disturb any cable introduced in the cable introduction opening.

20. In a cable sleeve according to claim 19, wherein said one end wall and seal member having a cavity for receiving a sealing block of an elastic sealing material, said seal block having an opening and being compressed onto a cable inserted through said opening when the seal member is secured to the one end wall.

* * * * *